Dec. 19, 1967     C. A. GOFFE ETAL     3,359,107
PHOTOGRAPHIC ELEMENT
Filed May 22, 1964
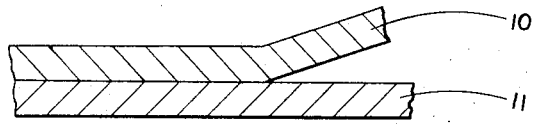
FIG·1
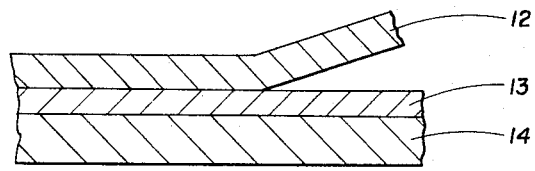
FIG·2
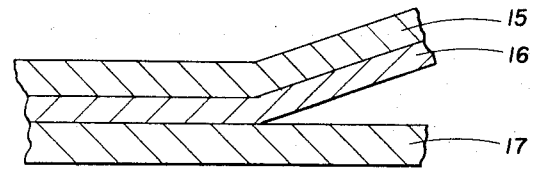
FIG·3
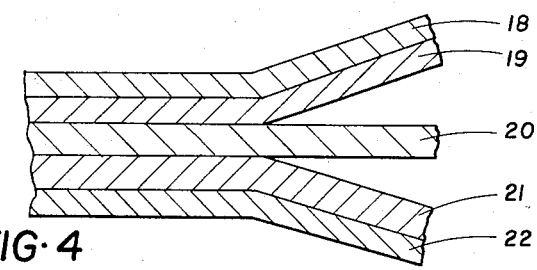
FIG·4
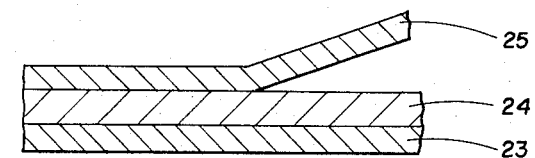
FIG·5
CHARLES A· GOFFE
WILLIAM J· VENOR
INVENTORS
BY R. Frank Smith
Ogden H. Webster
ATTORNEYS United States Patent Office 3,359,107
Patented Dec. 19, 1967

3,359,107
PHOTOGRAPHIC ELEMENT
Charles A. Goffe and William J. Venor, Rochester, N.Y.,
assignors to Eastman Kodak Company, Rochester, N.Y.,
a corporation of New Jersey
Filed May 22, 1964, Ser. No. 369,454
13 Claims. (Cl. 96—83)

ABSTRACT OF THE DISCLOSURE

A self-supporting polyolefin stripping layer is removably adhered to a primary support. In one of the aspects of the invention, the stripping layer or the primary support also comprises a radiation-sensitive layer for photographic use. In another aspect, the primary support comprises a photographic film or a photographic paper with a resin latex release coating thereon.

---

This invention relates to photographic elements, and more particularly to photographic stripping materials and the process for their preparation.

Photographic stripping films are useful in many photographic processes, such as photoengraving and photolithography. In many of the photographic stripping films of the prior art, stripping could only be effected in a solution. Such wet stripping layers have been very fragile. Previous dry stripping photographic materials have not been entirely satisfactory since the stripping characteristics have not been uniformly good, or the difficulty of obtaining satisfactory stripping characteristics has prevented commercial use for economic reasons.

One object of our invention is to provide photographic stripping materials. Another object of our invention is to provide photographic stripping materials which have excellent stripping characteristics either wet or dry. A further object of our invention is to provide photographic stripping films which are economical to prepare and which have good stripping and handling characteristics. Still another object of our invention is to provide a method for easily controlling the stripping characteristics of photographic stripping film. Other objects of our invention will appear herein.

In accordance with our invention, we provide a photographic support comprising a primary support such as film base or paper having removably adhered thereto a polyolefin secondary support. Either the primary support or the polyolefin secondary support may serve as the permanent support for a photosensitive coating, although in the preferred embodiment of our invention, the polyolefin film serves as the permanent support. We have found that photographic stripping materials in accordance with our invention possess excellent wet and dry stripping characteristics. Moreover, we have found that the adhesion of the polyolefin secondary support to the primary support may be easily regulated to provide the desired degree of adhesion by controlling the temperature of the polyolefin film as it is extruded onto the primary support. Photographic stripping elements in accordance with the invention are economical to prepare and provide a permanent support for photosensitive materials which may be coated thereon. The supports in accordance with our invention have good strength and dimensional stability either wet or dry.

The accompanying drawings illustrate, in cross section, the stripping supports in accordance with our invention, and typical light sensitive elements employing such stripping supports. FIG. 1 shows a primary support 11 which may be paper or film base having removably adhered thereto a polyolefin secondary support 10.

FIG. 2 shows a stripping support comprising a paper base 14 having a release coating 13 thereon and a polyolefin stripping layer 12 removably adhered to the release coating 13 of paper support 14.

FIG. 3 shows a typical photosensitive element employing a stripping layer in accordance with the invention, comprising a primary support 17 having removably adhered thereto a polyolefin stripping layer 16 carrying a light sensitive layer 15 thereon.

FIG. 4 shows a primary support 20, which may be composed of paper or film base, having two polyolefin stripping layers adhered on either side 19 and 21, each of which carry, respectively, light sensitive layers 18 and 22. In a different embodiment, layer 18 may be a gelatin silver halide emulsion and layer 22 a nucleating layer. These and other embodiments will be more fully described hereinafter.

FIG. 5 shows a stripping element wherein a light sensitive layer 23 is coated on the primary support 24 which serves as the permanent support, and the polyolefin secondary support 25 is the temporary support which is removably adhered to the reverse side of primary support 24.

Our invention will be further illustrated in the following examples. Examples 1–3 show stripping elements wherein the temporary support is paper having a release coating thereon, a permanent polyolefin support is removably adhered to the release coating of the paper support, and a light sensitive gelatin silver halide emulsion is coated on the polyolefin support.

Example 1

A paper weighing 27 pounds per 1000 sq. ft. having a baryta coating on the face side was coated on the wire side with a polyethylene coating 0.4 mil thick, and the baryta-coated side was extrusion coated (temperature of extrusion 600° F.) with a composition consisting of 85% polyethylene (density 0.935) and 15% titanium dioxide. The polyethylene coating was subjected to corona discharge in accordance with the method described in Alsup et al. U.S. patent application Ser. No. 191,711, filed May 2, 1962, now abandoned to obtain a contact angle (described hereinafter) of 55°, using corona discharge apparatus of the type described in U.S. Patent 2,864,755. The electron bombarded polyethylene coated paper was then overcoated with a fine grain gelatin-silver chlorobromoiodide emulsion at a silver coverage of 456 mg. per square foot and a gelatin coverage of 452 mg. per sq. ft. The photographic element thus prepared was exposed to a continuous step wedge and strips of the film were developed in Kodak Developer D–85 for various times. The processed emulsion was stripped from the paper support and the speed, effective contrast, fog and gamma were evaluated with the results shown in Table I.

TABLE I

| Time (minutes) | 1¾ | 2¼ | 2¾ | 3¼ | 3¾ | 4¼ |
|---|---|---|---|---|---|---|
| Speed | 1.14 | 1.56 | 1.96 | 2.22 | 2.55 | 2.69 |
| Gamma | 9.90 | 13+ | 13+ | 12.00 | 7.30 | 7.30 |
| Effective contrast | 2.20 | 6.00 | 8.00 | 9.00 | 5.00 | 5.00 |
| Fog | 0.04 | 0.04 | 0.04 | 0.04 | 0.04 | 0.04 |

The dry stripping characteristics of the photographic element were found to be excellent. The emulsion and polyolefin stripping layer could easily be lifted from a corner of the support and then easily pulled away from the baryta coated support. The wet stripping characteristics of the element were excellent.

Example 2

The procedure of Example 1 was followed except that the paper stock of Example 1 was "nip-sized" with 1%, based on the weight of the paper, myristo chromic chloride. Stripping layers of both polyethylene and polypropylene were employed. Both samples exhibited excellent dry and wet stripping characteristics.

*Example 3*

A 100% bleached sulfite paper stock 10 pounds per 1000 sq. ft. was coated with an aqueous dispersion of 18% titanium dioxide, and 82% of a vehicle composed of 47.5% styrene-butadiene copolymer (containing about 76% by weight styrene), 30.5% polystyrene and 4% casein. After drying, the reverse side of the paper was given a .4 mil coating of polyethylene to waterproof the paper base. The latex surface of the temporary support was then extrusion coated with polyethylene, density 0.935, at an extrusion temperature of 600° F. The surface of the second polyethylene coating was then subjected to corona discharge to obtain a contact angle of 55°, and then coated with a fine grain gelatin silver chlorobromoiodide emulsion to provide a silver coverage of 456 mg. per square foot and a gelatin coverage of 452 mg. per square foot. The stripping characteristics of sample strips 2 x 10 inches were tested by pulling down lengthwise 1 inch of the polyolefin film from the temporary support, attaching a 12.5 gram clip to the free film, holding the temporary support at a 45° angle and testing the rate of stripping of the polyolefin support from the temporary support by attaching various weights to the clip. The polyolefin film stripped from the temporary support when a 20 gram weight was attached to the clip at a rate of 3-4 inches per 11 seconds, and the remaining 9 inches of the film stripped off within 24-33 seconds. A 10 gram weight barely stripped off the film from the temporary support, at the approximate rate of about 1 inch per 45-50 seconds. A 5 gram weight did not strip the film at all. Another sample of the same stripping film was then exposed, developed in a standard developer for about 4 minutes and after processing samples were tested for adhesion of the polyolefin film to the latex coating. The stripping characteristics of the film were essentially the same as those of the samples tested prior to processing. Sensitometric tests of the processed film indicated good speed, contrast and low fog.

*Example 4*

The procedure of Example 3 was followed except that a cellulose triacetate film base was substituted for the latex coated paper. Excellent stropping characteristics both wet and dry were obtained with this material.

The primary support employed in the stripping elements of our invention is preferably a paper base. Advantageously, the paper base is coated on the back side with a suitable water-proofing coating, such as a polyolefin, e.g., polyethylene or polypropylene. Other waterproofing coatings, for example, vinyl benzene-butadiene copolymer coatings, may be employed to impart waterproofness. However, it is not necessary to employ paper as the base. Good results may be obtained with glass, metal supports, or any film base, such as the cellulose esters, e.g., cellulose acetate, cellulose acetate butyrate, cellulose acetate propionate; polyesters, such as polyethylene glycol-terphthalic acid polyesters; polyamides; polycarbonates, and the like.

In accordance with our invention, when a paper support is employed, it is preferably coated with a vinyl benzene-butadiene latex. The latex may be advantageously coated directly onto a paper support, which paper may have been sized with any of the usual sizing agents well known in the art. It is also sometimes desirable, when supports other than paper are employed, to provide a latex release coating thereon to provide excellent stripping characteristics. When various film bases are employed, it is sometimes desirable to provide a subbing layer to provide adequate adhesion between the latex coating and the support. Such subbing coatings are well known in the art. The latex coatings which may be employed are preferably a combination of a vinyl benzene homopolymer, such as polystyrene, together with a vinyl benzene butadiene copolymer, such as styrene-butadiene copolymer. Advantageously, these latex coatings contain about 60-90% vinyl benzene butadiene copolymer (having 60-80% vinyl benzene) and about 40-10% vinyl benzene homopolymer. Other suitable resin latex release coatings include, for example, polystyrene-ethylhexylacrylate; polyvinyl acetatedibutyl maleate; polyvinyl chloride-alkylacrylates, e.g., polyvinyl chloride-ethylacrylate; and, polyvinyl acetate. A particularly useful latex coating composition is one containing 15-23% titanium dioxide; 0-6% pigment, e.g., cabon black; and, 77-85% vehicle composed of 44.3-49.2% styrene-butadiene copolymer (60-80% by weight styrene); 28.7-31.4% polystyrene and 3.8-4.2% casein. Other resin solutions which may be coated on a temporary support to provide stripping elements in accordance with the invention having excellent stripping characteristics include polyethylacrylate-acrylic acid; polyvinyl acetate-crontonic acid; and, polystyrene-maleic acid solutions. The latex coatings useful in accordance with the invention are not limited to the above. In general, any coating or process may be employed which imparts a smooth surface to the temporary support. Thus, a Werner chromium complex salt may be coated onto the primary support. Such complexes are those in which a chromium atom is coordinated with a carboxylic acid group having at least 10 carbon atoms, such as stearate, palmitate, laurate, and abietate groups. The complex salts may be prepared by reaction of the appropriate organic acid with chromium compounds for example, by the method described in U.S. Patents 2,273,040 and 2,359,858. Also, suitable surfaces may be achieved with baryta coated paper. A cotton-to-steel calendered gelatin sized paper may also be employed with good results.

In accordance with our invention, a polyolefin film is extruded onto the primary support. The polyolefins employed preferably should have a density sufficiently high to provide a film of suitable stiffness. The polyolefin is preferably extruded at a thickness of about 1 mil although the thickness may vary from about 1.0 to 1.2 mils. A thickness of at least 1.0 mil is desirable for best handling and minimum stretching. Greater thicknesses than about 1.2 mils may cause optical distortions in print back in some applications. The temperature at which the polyolefin is extruded is important, since the adhesion to the primary support is controlled thereby. In general, extrusion temperatures of about 580° to 620° F. provide adequate results when the polyolefin film is contacted within a short distance, say up to 3 or 4 inches from the extrusion orifice, with the primary support. Extrusion temperatures of about 600° F. generally produce a degree of adhesion to a latex coated support which provides satisfactory stripping characteristics.

As noted heretofore, the degree of adhesion of the polyolefin secondary support to the primary support may be controlled by adjusting the extrusion temperature. Greater adhesion is achieved by higher extrusion temperatures. Testing the adhesion of the polyolefin film to the primary support is advantageously accomplished by providing a 2" by 10" strip of the film, pulling 1 inch of the polyolefin film from the primary support lengthwise, attaching a 12.5 gram clip to the free end of the film, positioning the temporary support at a 45° angle, and attaching various weights to the clip and measuring the rate at which the polyolefin film is stripped from the primary support. Best results are provided when a 20 gram weight removes the remaining 9 inches of the film within 24-33 seconds; a 10 gram weight strips the film at the rate of 1 inch in 45-50 seconds and a 5 gram weight fails to strip the film from the temporary support. A degree of adhesion meeting these requirements provides excellent dry stripping characteristics (as well as excellent wet stripping if that is desired) and yet retains sufficient adhesion to the temporary support so as not to be removed during processing.

The polyolefins which we employ in our invention are preferably polyethylene, polypropylene or a polyallomer, although other polyolefins may be employed.

The temporary support which has been extrusion coated with a layer of polyolefin is then coated with a photosensitive substance, preferably a silver halide emulsion, gelatin-silver halide emulsions giving especially satisfactory results. Other colloid binders besides gelatin, such as polyvinyl alcohol and other well known gelatin substitutes, may be employed. Also, radiation-sensitive systems other than silver halide emulsions can be used if desired. When silver halide emulsions in a colloid binder such as gelatin are employed, it is desirable to treat the surface of the polyolefin permanent support after extruding it on the latex coated temporary support in some manner to assure adequate adhesion between the polyolefin film and the silver halide emulsion. This may be advantageously accomplished by electron bombarding the surface of the polyolefin film to obtain a contact angle less than 76 degrees (for example with apparatus of the type disclosed in Rothacker U.S. Patents 2,864,755 and 2,864,756). The contact angle is a measurement of the level of electron bombardment and is determined by placing a drop of distilled water on a level sample and projecting the image of the drop and sample on a suitable screen and measuring the angle of a line tangent to the drop image at the point the edge of the drop touches the sample, to give the angle referred to herein as the contact angle. Other treatments may be given the polyolefin surface, such as flaming or acid treatments, which oxidize the surface of the polyolefin, to enhance adhesion of the silver halide emulsion thereto. Other methods of adhering the emulsion to the polyolefin film may be employed, such as providing a suitable subbing layer.

It will also be understood that if desired the stripping layer or other layers present in the elements of our invention may contain colorless particles for use as matting agents, colored particles or dyes for use as antihalation or filter layers or silver precipitating agents for forming positive images as by silver halide diffusion transfer systems.

The stripping supports of our invention may be employed in all the applications heretofore suggested for conventional photographic stripping elements. For example, a suitable temporary support may be extrusion coated on both sides with a polyolefin stripping layer. As shown in FIG. 4, a permanent support 20 composed of a film base has extrusion coated thereon polyolefin stripping layers 19 and 21. Polyolefin stripping layer 19 is provided with a gelatin silver halide emulsion 18 and polyolefin stripping layer 21 is provided with a nucleating layer 22. This photographic element may be exposed to provide a latent image in the emulsion layer 18, processed and wound upon itself in accordance with the method described in U.S. Patent 2,882,151 to transfer the image to the nucleated layer to provide a positive image.

Another use of the stripping supports of our invention may be understood with reference to FIG. 4 wherein temporary support 20 is a film base, and polyolefin stripping layers 19 and 21 each carry light sensitive silver halide emulsion layers 18 and 22. In one use, such elements may be pre-exposed and processed to provide a screen pattern on one side, and then the opposite side may be re-exposed through the screen, processed and stripped. In another use, one emulsion layer may be a fast emulsion, which may be exposed, surface developed to provide a negative, and the reverse side may then be exposed through the negative image to obtain a strippable positive image. The negative may also be stripped if desired. In a different variation, layer 18 may be a light sensitive, black pigmented polymer and layer 22 a silver halide emulsion. In use, the emulsion is exposed and surface processed to provide a negative, and the light sensitive polymer layer is then exposed through the negative causing the polymer to cross-link in the image areas. The non-image areas of the polymer layer are selectively removed with a suitable solvent to produce a strippable positive.

The invention has been described in detail with particular reference to preferred embodiments thereof but it will be understood that variations and modifications can be effected within the spirit and scope of the invention as described hereinabove and as defined in the appended claims.

We claim:

1. A photographic element comprising a photographic film support or a paper support as a primary support, and a self-supporting polyolefin stripping layer extruded onto and removably adhered to said primary support.

2. A photographic element comprising a photographic film support or a paper support as a primary support, and a secondary support comprising a self-supporting polyolefin film extruded onto and removably adhered to said primary support, at least one of said supports having a radiation-sensitive layer thereon.

3. A photographic element comprising a photographic film support or a paper support as a temporary support, said temporary support having extruded thereon and removably adhered thereto a self-supporting polyolefin stripping layer, said stripping layer having a light-sensitive layer thereon.

4. A photographic stripping film comprising a temporary support composed of a paper base having a resin latex release coating thereon, a polyolefin stripping layer removably adhered to the resin latex coated paper support, and a gelatino silver halide emulsion coated on the polyolefin stripping layer.

5. The photographic stripping film of claim 4 wherein the resin latex is composed of 10–40% by weight vinyl benzene homopolymer and 60–90% by weight vinyl benzene-butadiene copolymer, 60–80% by weight of said copolymer being vinyl benzene, and the polyolefin is polyethylene.

6. A photographic element comprising a primary support having extruded thereon and removably adhered thereto a self-supporting polyethylene or polypropylene stripping layer, the adhesion of said stripping layer to said primary support being such that when 1 inch of said stripping layer is stripped from samples of said photographic element 10 inches long and 2 inches wide, and when 12.5 gram clips are attached to the stripped ends of said stripping layer and weights of 20 grams, 10 grams, and 5 grams are attached to the clips on the stripped ends of said stripping layer while the primary supports are held at a 45° angle, the 20 gram weight strips the remaining 9 inches of said stripping layer off the primary support within 24–33 seconds, the 10 gram weight strips the stripping layer at the rate of 1 inch in 45–50 seconds, and the 5 gram weight fails to strip the stripping layer.

7. The photographic element of claim 6 wherein the primary support is paper having a release coating thereon comprising 15–23% titanium dioxide; 0–6% carbon black and 77–85% by weight of a vehicle composed of 44.3 to 49.2% by weight of a copolymer of vinyl benzene and butadiene, 60–80% by weight of said copolymer being styrene; 28.7–31.4% by weight polystyrene; and, 3.8–4.2% by weight of casein; the polyolefin is polyethylene; and, the polyethylene is removably adhered to the release coating.

8. The photographic element of claim 1 wherein said polyolefin stripping layer is extruded onto said primary support at a temperature of about 580° F. to about 620° F.

9. A photographic element comprising a photographic film support or a paper support as a primary support, a self supporting polyolefin stripping layer removably adhered to said primary support and at least one of said supports having a radiation-sensitive layer thereon.

10. A photographic element according to claim 9 wherein said radiation-sensitive layer is a silver halide emulsion layer.

11. A photographic element according to claim 9 wherein said primary support comprises a paper support or a photographic film support having a latex release coating thereon.

12. A photographic element according to claim 1 wherein said release coating comprises a vinyl benzene-butadiene latex.

13. A photographic element according to claim 9 wherein said polyolefin stripping layer is contiguous to said primary support.

References Cited

UNITED STATES PATENTS 3,149,973   9/1964   Winchell _____ 96—83

OTHER REFERENCES

Renfrew, A., et al., "Polyethylene, the Technology and Uses of Ethylene Polymers," 1957, pages 352, 403 and 404.

Keil, J. W., et al., "Paper, Film, and Foil Converter," August 1958, page 35.

NORMAN G. TORCHIN, *Primary Examiner.*

R. H. SMITH, *Assistant Examiner.*